United States Patent
Gupta et al.

(10) Patent No.: US 8,145,910 B1
(45) Date of Patent: Mar. 27, 2012

(54) SYSTEM AND METHOD TO ENFORCE COLLABORATION RULES FOR TIMESTAMPS OF A COLLABORATION EVENT

(75) Inventors: Yash Kumar Gupta, Agra (IN); Rajeev Sharma, Ghaziabad (IN); Narinder Beri, Jalandhar (IN)

(73) Assignee: Adobe Systems Incorporated, San Jose, CA (US)

( * ) Notice: Subject to any disclaimer, the term of this patent is extended or adjusted under 35 U.S.C. 154(b) by 1063 days.

(21) Appl. No.: 12/040,347

(22) Filed: Feb. 29, 2008

(51) Int. Cl.
*H04L 9/32* (2006.01)
(52) U.S. Cl. .......... 713/178; 726/26
(58) Field of Classification Search .......... None
See application file for complete search history.

(56) References Cited

U.S. PATENT DOCUMENTS

| | | | |
|---|---|---|---|
| 6,209,090 B1* | 3/2001 | Aisenberg et al. .......... 713/178 |
| 6,615,234 B1* | 9/2003 | Adamske et al. .......... 709/203 |
| 6,728,880 B1* | 4/2004 | Sites .......... 713/178 |
| 6,898,709 B1* | 5/2005 | Teppler .......... 713/178 |
| 7,065,679 B2* | 6/2006 | Nakamura et al. .......... 714/47.3 |
| 7,702,909 B2* | 4/2010 | Vainstein .......... 713/178 |
| 2002/0056042 A1* | 5/2002 | van der Kaay et al. .......... 713/178 |
| 2002/0104004 A1* | 8/2002 | Couillard .......... 713/178 |
| 2002/0123964 A1* | 9/2002 | Kramer et al. .......... 705/40 |
| 2002/0169974 A1* | 11/2002 | McKune .......... 713/200 |
| 2003/0041184 A1* | 2/2003 | Tervo .......... 710/1 |
| 2003/0159048 A1* | 8/2003 | Matsumoto et al. .......... 713/178 |
| 2003/0217264 A1* | 11/2003 | Martin et al. .......... 713/156 |
| 2003/0233553 A1* | 12/2003 | Parks et al. .......... 713/178 |
| 2004/0025113 A1* | 2/2004 | Penke et al. .......... 715/511 |
| 2005/0133582 A1* | 6/2005 | Bajikar .......... 235/10 |
| 2006/0107042 A1* | 5/2006 | Kohmoto .......... 713/158 |
| 2006/0146885 A1* | 7/2006 | Kimball et al. .......... 370/503 |
| 2007/0078694 A1* | 4/2007 | Finke et al. .......... 705/8 |
| 2007/0106930 A1* | 5/2007 | Imai .......... 715/511 |
| 2007/0124819 A1* | 5/2007 | Strohwig et al. .......... 726/26 |
| 2007/0136423 A1* | 6/2007 | Gilmore et al. .......... 709/204 |
| 2008/0072334 A1* | 3/2008 | Bailey et al. .......... 726/28 |
| 2009/0024433 A1* | 1/2009 | Guardascione et al. .......... 705/8 |

OTHER PUBLICATIONS

KSDOT (E-Plans—User Guide for Electronic Plans Review); Jan. 28, 2011; (Note that the content relied upon in KSDOT are screenshots and corresponding explanations of Adobe Acrobat 8, which was released in Nov. 2006); 41 total pages; accessed at http://www.ksdot.org/burLocalProj/BLPDocuments/KDOTBLPEplans.pdf.*

Padova (More Enabling Features for Adobe Reader); Sep. 26, 2006; 4 total pages; accessed at http://acrobatusers.com/print/365.*

* cited by examiner

*Primary Examiner* — Keith Vicary
(74) *Attorney, Agent, or Firm* — Schwegman, Lundberg & Woessner, P.A.

(57) ABSTRACT

A method to enforce collaboration rules, in one example embodiment, comprises receiving a request to report a collaboration event to a collaboration workflow, receiving a reported time of the collaboration event, determining an origin of the reported time, updating the reported time with a central time service time when the origin of the reported time is not a central time service, and based on the updated reported time, selectively reporting the collaboration event into the collaboration workflow.

25 Claims, 7 Drawing Sheets

| |
|---|
| COLLABORATION EVENT TYPE<br>602 |
| INVITATION MODE<br>604 |
| EXPIRY TIME<br>606 |
| REPORTED TIME<br>608 |
| UPDATED TIME<br>610 |
| CONNECTION FLAG<br>612 |

FIG. 6

SYSTEM AND METHOD TO ENFORCE COLLABORATION RULES FOR TIMESTAMPS OF A COLLABORATION EVENT

TECHNICAL FIELD

This application relates to system and method to enforce collaboration rules.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Desktop applications may provide a collaboration workflow (e.g., users working together on a single document or a set of documents). Relying on the time reported by the user's machine to enforce time-sensitive business rules is prone to error because the machine time may be modified by a user, thereby disrupting the collaboration workflow. For example, a user may modify his machine time in order for the collaboration workflow processor to assign an incorrect time to an event (e.g., an event associated with signing of a document).

BRIEF DESCRIPTION OF DRAWINGS

Embodiments are illustrated by way of example and not limitation in the figures of the accompanying drawings, in which like references indicate similar elements and in which:

FIG. 6 is a block diagram illustrating a collaboration record, in accordance with an example embodiment.

DETAILED DESCRIPTION

Figure 1:
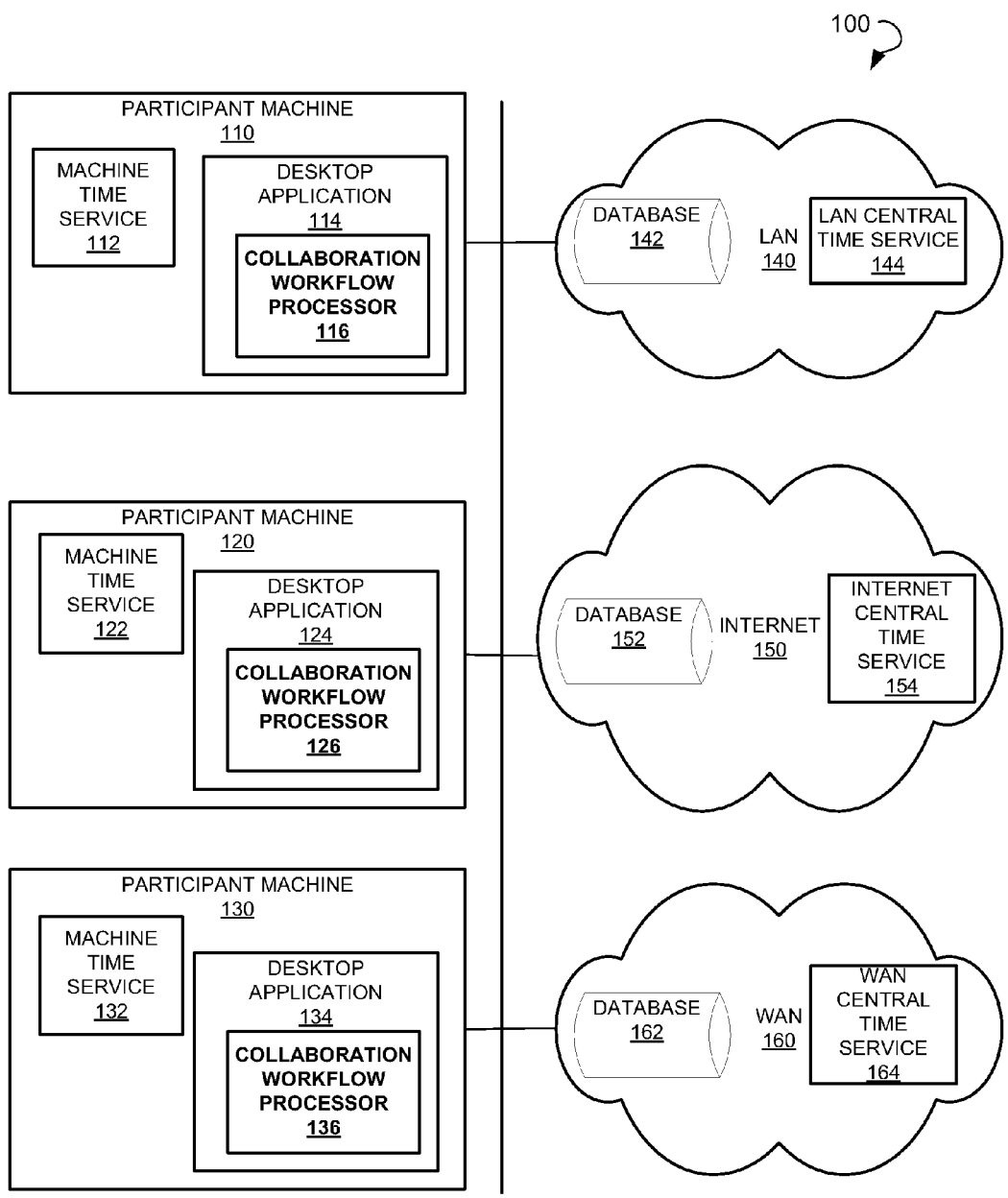
FIG. 1 is a diagrammatic representation of a network environment within which method and system to enforce collaboration rules may be implemented, in accordance with an example embodiment.

An example collaboration workflow, or an electronic document workflow, may be described as a process by which users (workflow participants) interact with an electronic document by manipulating their respective instances of the document and, in some workflows, being permitted to view and react to input originated from other participants. One example of a document workflow is a shared review of an electronic document, which may be facilitated by a viewer application, such as Adobe® Acrobat® software.

A user interaction with the document that is the subject of a workflow, e.g., adding a comment to the document, is treated by the associated viewer application as a collaboration event that may become part of the workflow. An example of a collaboration event is submitting form data to a collaboration workflow, which is a form distributing workflow. Collaboration events may be automatically added to the workflow and may be made accessible by other workflow participants. An initiator of a collaboration workflow may provide a workflow deadline—e.g., a time at which the collaboration workflow should be completed by participants. A workflow may operate such that any collaboration event that occurs after the time designated as a deadline is not entered into the workflow. For example, a participant attempting to comment on the document after the deadline would be precluded from using the workflow to share the comments with other participants.

A workflow deadline may be enforced by time-stamping each workflow event and entering the event into the workflow only if the time stamp indicates that the event occurred before the deadline has been reached. The time stamp for an event may be generated using local time reported by a participant's computer system. The time reported by a participant's computer system may not always be accurate, which may lead to a situation where a time stamp provided by the clock in a participant's computer system indicates that the associated event may be entered into the workflow, while the deadline in fact has already passed.

In one embodiment, a central time service is utilized to time-stamp collaboration workflow events. A central time service may be used advantageously to provide common time reference, e.g., in a situation where workflow participants are located in different time zones, and may also contribute to ensuring that workflow rules regarding a deadline are enforced regardless of the respective time settings at the participant's machines. In operation, according to one example embodiment, when a network connection is available to a workflow participant, a collaboration event is time-stamped with a central time service time obtained from the central time service provided within the network. If the network connection is not available to a participant at the time of a collaboration event, the event is time-stamped with the local machine time. Once the network connection becomes available, the local machine time is updated with the central time service time. Thereafter, the event is entered into the collaboration workflow if the deadline has not passed.

This disclosure is related to a system and method to enforce collaboration rules by providing a central time service time to a collaboration workflow. The system and method to enforce collaboration rules may facilitate enforcing time rules established for the collaboration workflow based on the time provided by a central time service. The central time service, as used within the context of this disclosure, is a time service providing current time to the participants of the collaboration workflow.

In one example embodiment, the collaboration workflow may involve participants located anywhere on the Internet. In case of the Internet based collaboration workflow, the collaboration rules may be enforced based on the time provided by an Internet central time service.

In some other example embodiments, the collaboration workflow participation may be limited to machines located within a Local Area Network (LAN) or a Wide Area Network (WAN). In case of LAN or WAN based collaboration workflows, collaboration rules may be enforced based on the time provided by a LAN central time service or a WAN central time service respectively.

A determination of whether the collaboration workflow processor enforces collaboration rules based on the Internet central time service, the LAN central time service, or WAN central time service, may be established at the time of the origination of the collaboration workflow.

The system and method to enforce collaboration rules by providing a central time service to a collaboration workflow permits to enforce the collaboration rules even when the central time service is unavailable due to the participant's machine being disconnected from its collaboration workflow network (e.g., Internet, LAN or WAN). When a participant's machine is disconnected from the network, a collaboration event caused by the participant may be time-stamped using the time reported by the participant's machine. When the participant's machine is connected to its collaboration workflow network, the time reported to the collaboration workflow processor may be updated with a central time service time. The central time service time may be obtained by querying the central time service. Example system and method to enforce collaboration rules may be implemented in the context of a network environment and may be discussed with reference to FIG. 1.

FIG. 1 is a diagrammatic representation of a network environment within which method and system to enforce collaboration rules may be implemented by providing central time service, in accordance with an example embodiment. As shown in FIG. 1, the network environment 100 may include participant machines 110, 120, and 130 connected to one or more networks, such as a LAN 140, the Internet 150, and a WAN 160.

The participant machine 110 may host a machine time service 112 that may be used to time stamp events associated with a desktop application 114. Events may be processed by a collaboration workflow processor 116 that may be provided with the desktop application 114. The participant machine 120 may host a machine time service 122 and a desktop application 124 configured to include a collaboration workflow processor 126. The participant machine 130 may host a machine time service 132 and a desktop application 134 configured to include a collaboration workflow processor 136.

The machine time services 112, 122, and 132, may be configured to provide current time to a collaboration workflow when a central time service of the collaboration workflow is temporarily unavailable. For example, when the participant machine 110 is configured as part of a LAN 140 but is temporarily disconnected from the LAN 140, any collaboration events that take place at the participant machine 110 during that time are time stamped utilizing the machine time services 112. Upon connecting to the central time service 144 provided within the LAN 140, the time stamp provided by the machine time service 112 may be updated with the central time service time. The desktop applications 114, 124, and 134, in one embodiment, may be a content viewing application, such as Adobe® Acrobat® software.

As shown in FIG. 1, the participant machines 110, 120, and 130 may be interconnected with the LAN 140, the Internet 150, and the WAN 160. The LAN 140 and the WAN 160 may be connected to the Internet 150 and each other. Even though the LAN 140 and WAN 160 are illustrated as stand-alone networks, they may be parts of the Internet 150. Furthermore, the LAN 140 may be a part of WAN 160 and the WAN 160 itself may be a part of the Internet 150.

The LAN 140 is a computer network covering a small geographic area, like a home, office, or group of buildings (e.g. a school). The Internet 150 is a worldwide, publicly accessible series of interconnected computer networks that transmit data by packet switching using the standard Internet Protocol.

The WAN 160 is a computer network that may cover a broad area such as any network whose communications links cross metropolitan, regional, or national boundaries. The WAN 160 is a network that may use routers and public communications links. The WAN 160 may be used to connect LANs (e.g., the LAN 140) and other types of networks together, so that users and machines in one location may communicate with users and machines in other locations. Even though the LAN 140 and the WAN 160 are shown connected to the Internet 150 in the network environment 100, they may, in some embodiments, be disconnected (temporarily or permanently) from the Internet 150.

The LAN 140, the Internet 150, and the WAN 160 may each include a database. The databases 142, 152, and 162, residing within the LAN 140, the Internet 150, and the WAN 160, may store their respective data records related to collaboration workflows, collaboration events, collaboration rules, and invitations sent to participants of collaboration workflows. For example, the databases 142, 152, and 162 may include data related to the origin of the reported time based on connection data indicative of whether the central time service was available when the collaboration event occurred.

The database 142 may be located within a LAN environment for a LAN based collaboration workflow. In case of a LAN based collaboration workflow, the database 142 may only be accessible to LAN participants. Similarly, the database 162 may be located within a WAN environment for a WAN based collaboration workflow.

In case of a WAN based collaboration workflow, the database 162 may only be accessible to WAN participants. In the case of an Internet based collaboration workflow, the database 152 may be accessible to the participants of the Internet based collaboration workflow. The databases 142, 152, and 162 may receive write and/or read requests and send responses to their respective LAN, Internet, and WAN based collaboration workflows.

The databases 142, 152, and 162, in some example embodiments, may be configured as a structured collection of records or data that are stored in a computer system and may be queried by a computer program such as the desktop application 114. The records retrieved in response to queries are information that can be used to make decisions with respect to the collaboration rules. The databases 142, 152, and 162 may include collaboration records. An example data record of the databases 142, 152, and 162 is described with reference to FIG. 6.

The LAN 140, the Internet 150, and the WAN 160, each, may include a central time service (i.e., a LAN central time service 144, an Internet central time service 154, and a WAN central time service 164) to serve central time service time to the participants of their respective collaboration workflows. Thus, the LAN central time service 144, the Internet central time service 154, and the WAN central time service 164 may be configured to respond to time requests. Thus, when a participant connects to his collaboration network, the collaboration workflow may send a time request to its respective time service. The central time services 144, 154, and 164 may be set up by their respective network administrators.

In some example embodiments, the type of a central time service utilized by a collaboration workflow is determined upon its initiation. Thus, a LAN based collaboration workflow may utilize the LAN central time service 144. Similarly, a WAN based collaboration workflow may utilize the WAN central service 164.

The Internet central time service 154 may be configured to respond to requests for the central time service time from the Internet based collaboration workflow. For example, the United States Naval Observatory Network Time Protocol (NTP) may be utilized to provide central time service time. The NTP may be accessible by collaboration workflow processors 116, 126, and 136 running on the respective participant machines 110, 120, and 130. The collaboration workflow processors 116, 126, and 136 may be configured to utilize various other central time services. One embodiment of a collaboration workflow processor may be described with reference to FIG. 2.

Figure 2:
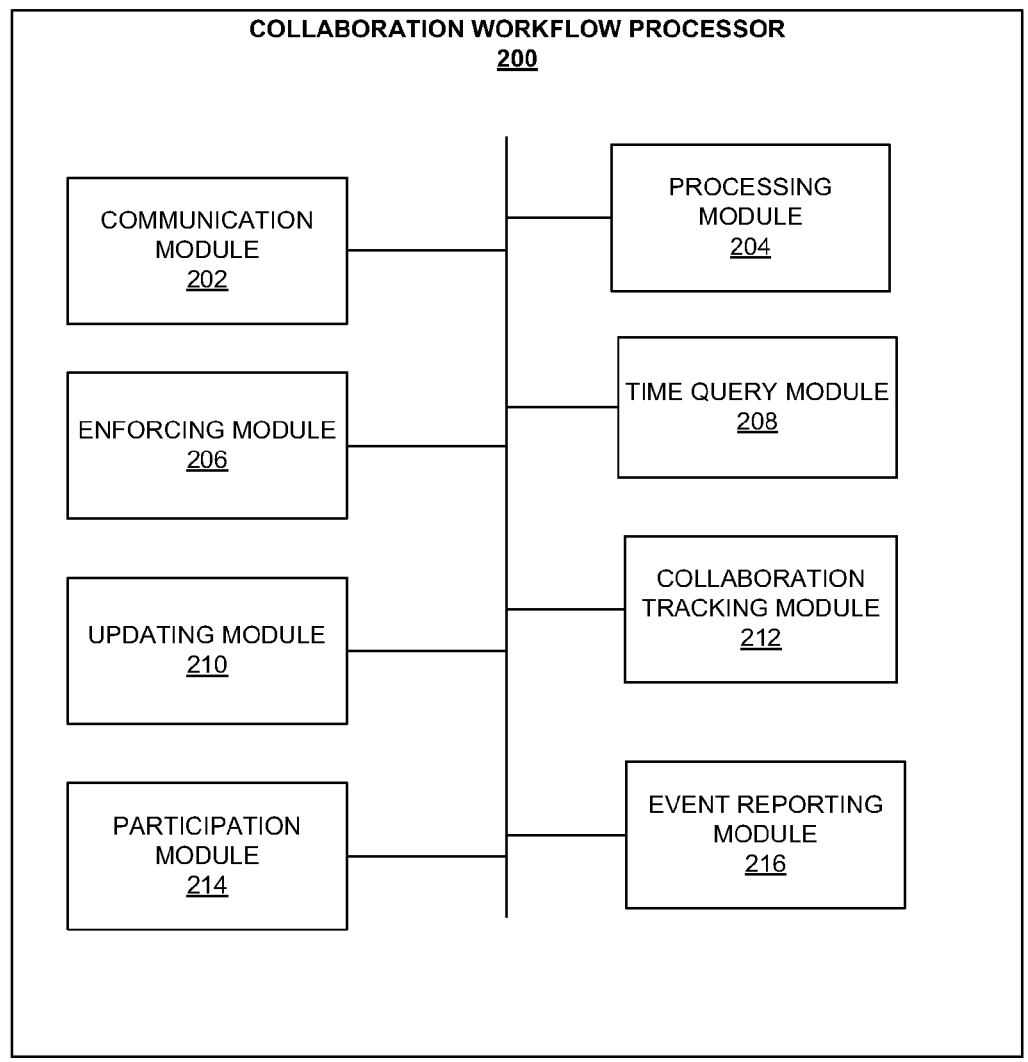
FIG. 2 is a block diagram illustrating a collaboration workflow processor, in accordance with an example embodiment.

FIG. 2 is a block diagram illustrating a collaboration workflow processor 200, in accordance with an example embodiment. Referring back to FIG. 1, a collaboration workflow processor may reside within a desktop application, such as the desktop application 114. The desktop application 114 may query a central time service (e.g., one of the central time services 144, 154, and 164) to obtain central time service time in order to time stamp a collaboration event and enforce collaboration rules (e.g., a workflow deadline) based on the time obtained.

As shown in FIG. 2, in some example embodiments, the collaboration workflow processor 200 may include a communication module 202, a processing module 204, an enforcing module 206, a time query module 208, an updating module 210, a collaboration tracking module 212, a participation module 214, and an event reporting module 216.

The time query module 208 may be configured to receive the time reported by a central time service. Depending on the specifics of collaboration workflow, a central time service utilized by the collaboration workflow processor 200 may be the LAN central time service 144, the Internet central time service 154, or the WAN central time service 164. When the central time service is unavailable, the communication module 202 may receive time reported by the machine time service 112.

The processing module 204 may be configured to determine whether the reported time is reported by the machine time service 112 or by a central time service. If the processing module 204 determines that reported time is the collaboration workflow machine time, the processing module 204 may request that the time query module 208 query the respective central time service as soon as the central time service becomes available. Once the time query module 208 is able to query the respective central time service, the updating module 210 may update the reported time.

The enforcing module 206 may be configured to enforce the collaboration rules by selectively reporting collaboration events to the collaboration workflow based on the time reported by the central time service, which may be reflected in a time stamp associated with the collaboration event.

In one example embodiment, the time query module 208 may be configured to query a database (e.g., the database 142 illustrated in FIG. 1) with a connection flag 612. A connection flag, illustrated in FIG. 6 as part of a collaboration record, is maintained in order to provide an indication of whether the time reported for a collaboration event is provided by a local or a central time service. If the processing module 204 determines that the reported time is local (e.g., the time service used to time stamp the collaboration event is the participant machine time), an associated central time service may be queried by the time query module 208. The central time service time thus obtained by the time query module 208 is used to update the reported time. Updating the reported time may involve utilizing a query language to replace the value in a record representing the reported time with the value of the central time service time.

In one example embodiment the updating may include utilizing the time query module 208 to query a central time service and utilizing the processing module 204 to compare the central time service time to the local machine time. Based on the comparison, a time difference between the central time service time and the local machine time may be established. The processing module 204 may further determine whether the central time service time and the local machine time are substantially similar by comparing the time difference to a predetermined threshold. If the local machine time and the central time service time are substantially similar, the reported time is not updated with the central time service time. If, on the other hands, the local machine time and the central time service time are not substantially similar, the reported time is updated with the central time service time.

In one example embodiment, the updating module 210 may be configured to update the reported time with the central time service time when the communication module 202 determines that an associated connection flag is set to local. The collaboration tracking module 212 may be configured to track collaboration events entered into the collaboration workflow and to report the collaboration events to the enforcing module 206.

The participation module 214 may be configured to invite other users to join the collaboration workflow (e.g., to review a document related to a product or performance). The invitations to participate in the collaboration workflow may be distributed, for example, via a website, e-mail, document management system, or a network share drive. Other distribution channels may also be utilized. For example, a user that may be referred to as the initiator of the collaboration workflow, may start a shared review by sharing a document in one of the above-mentioned ways with other users.

The event reporting module 216 may be configured to report a collaboration workflow event to the processing module 204. The event reporting module 216 may also be configured to cooperate with the enforcing module 206 or be configured as a part of the enforcing module 206. Example operations performed by various modules of the collaboration workflow processor 200 may be described with reference to FIG. 3.

Figure 3:
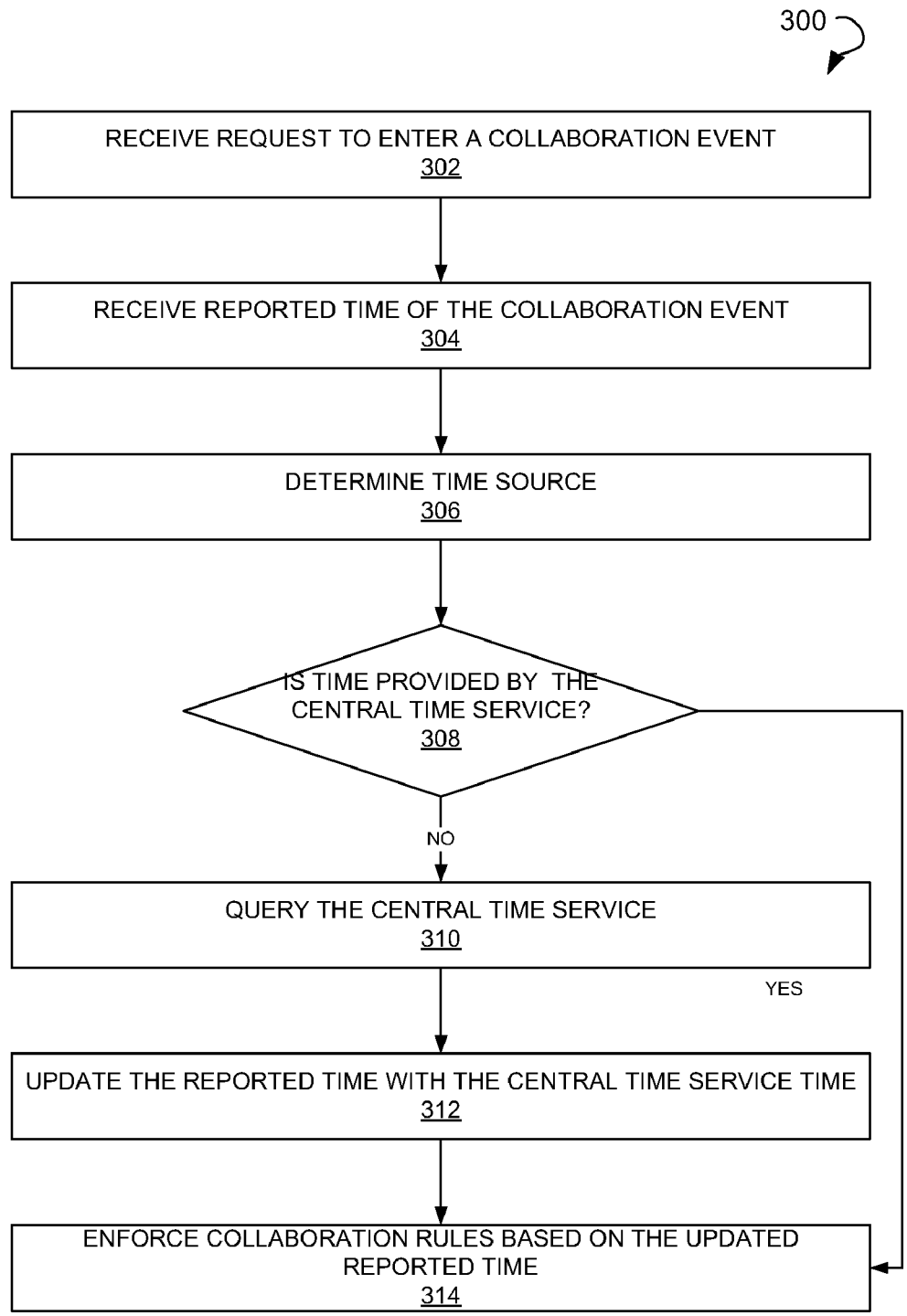
FIG. 3 is a high level flow chart illustrating a method to enforce collaboration rules by providing central time service, in accordance with an example embodiment.

FIG. 3 is a high-level flow chart illustrating a method to enforce collaboration rules, in accordance with an example embodiment. The method 300 may be performed by processing logic that may comprise hardware (e.g., dedicated logic, programmable logic, microcode, etc.), software (such as run on a general-purpose machine system or a dedicated machine), or a combination of both. In one example embodiment, the processing logic resides at the collaboration workflow processor 200 illustrated in FIG. 2.

As shown in FIG. 3, at operation 302, the communication module 202 of the collaboration workflow processor 200 may receive a request to enter a collaboration event in a collaboration workflow. The collaboration workflow, within the context of this disclosure, may be represented by any sort of collaboration on an electronic document such as an instance of Adobe® Acrobat®.

An example collaboration workflow may include a structured, recursive process where two or more people work together toward a common goal by sharing knowledge, learning, and building consensus over an electronic network. A collaboration workflow may not require a leading participant. For example, a collaboration workflow may include two or more people playing a network game on the Internet. Publishing of an event to a collaboration workflow may include posting a comment or executing a command. The method and system to enforce collaboration rules may be utilized in a scenario where a timeframe of events is important.

At operation 304, the communication module 202 of collaboration workflow processor 200 may receive a reported time of the collaboration event. The reported time may be either local time provided by the machine time service or the time provided by the central time service. The central time service permits the collaboration workflow processor 200 to ensure that users adhere to the collaboration rules based on time.

For example, if the collaboration rules dictate that all modifications to a document shall cease after a predetermined time, any modifications made thereafter, may be rejected. As already mentioned above, relying only on a participant's machine's local time in enforcing the collaboration rules may provide the participant with an opportunity to render time events (e.g., deadlines) unenforceable by modifying the machine's local time. Such modification may disrupt the collaboration process. Furthermore, other users may be led to believe that an event (e.g., signing a document) happened at the time provided by the participant's machine, which may be incorrect.

Thus, the system and method to enforce collaboration rules permits using a central time service (such as the LAN central time service 144 in FIG. 1) to time stamp events and related updates, thereby avoiding an exclusive use of participant machine's local time. Since a central time service, in one embodiment, does not allow modifications by participants of a collaboration workflow, with a possible exception of an administrator, a participant is not able to misinform the collaboration workflow processor 200 and other participants by modifying his machine's time.

At operation 306, the processing module 204 may determine the time service utilized to establish the time of collaboration events. For example, if the collaboration workflow is Internet based, the processing module 204 may determine that the Internet central time service 154 was used to time stamp a collaboration event.

At decision block 308, the processing module 204 may determine whether or not the reported time for the collaboration event is a central time service time. In some example embodiments, Simple Object Access Protocol (SOAP), a protocol for exchanging Extensible Markup Language (XML)-based messages over machine networks using Hypertext Transfer Protocol (HTTP), may be utilized by the collaboration workflow processor 200 to receive the central time service time from a central time service such as the Internet central time service 154 illustrated in FIG. 1. An example central time service may make its Application Programming Interface (API) available to web services utilizing SOAP to process requests for the central time by the collaboration workflow.

In one embodiment, the collaboration workflow processor 200 may utilize SOAP to send an HTTP request to the central time service (such as the Internet central time service 154 in FIG. 1). The Internet central time service 154 may respond by providing Greenwich Mean Time (GMT). The code sending the request may be implemented in various technologies including ASP.NET and VBScript. Sample VBScript implementation is shown below.

```
<%@ WebService Language="VBScript"
Class="TimeService">
    Imports System
    Imports System.Web.Services
    Public Class TimeService: Inherits WebService
        <WebMethod( )> Public Function GMTTime( ) As String
            //CODE TO COMPUTE THE CURRENT TIME
            //RETURN THAT TIME TO CALLER
        end function
    end class
```

If it is determined, at decision block 308, that the time service reported is not a central time service time, the processing module 204 may instruct the time query module 208 to query the central time service in order to determine the central time service time, at operation 310. At operation 312, the updating module 210 may update the reported time with the central time service time as described above with reference to the updating module 210 of the workflow collaboration processor 200.

At operation 314, the enforcing module 206 may enforce the collaboration rules based on the updated time of the collaboration event. If, on the other hand, it is determined at decision block 308 that the time service used by the collaboration event is the central time service time, the method 300 may proceed to enforce the collaboration rules at operation 314. Further details of a method to enforce collaboration rules may be described with reference to FIG. 4 and FIG. 5

Figure 4:
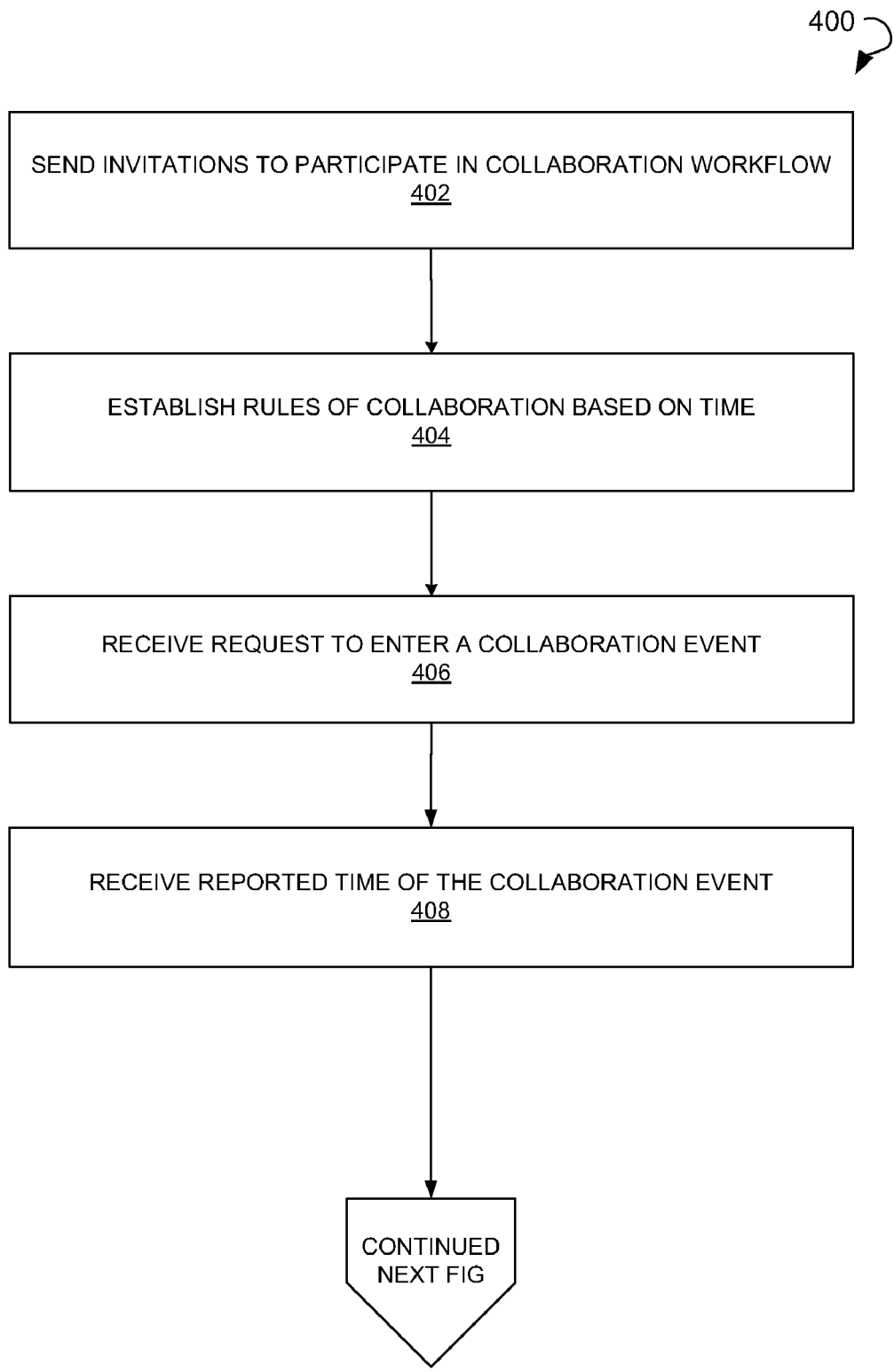
FIG. 4 is the first part of a detailed flow chart illustrating a method to enforce collaboration rules by providing central time service, in accordance with an example embodiment.
Figure 5:
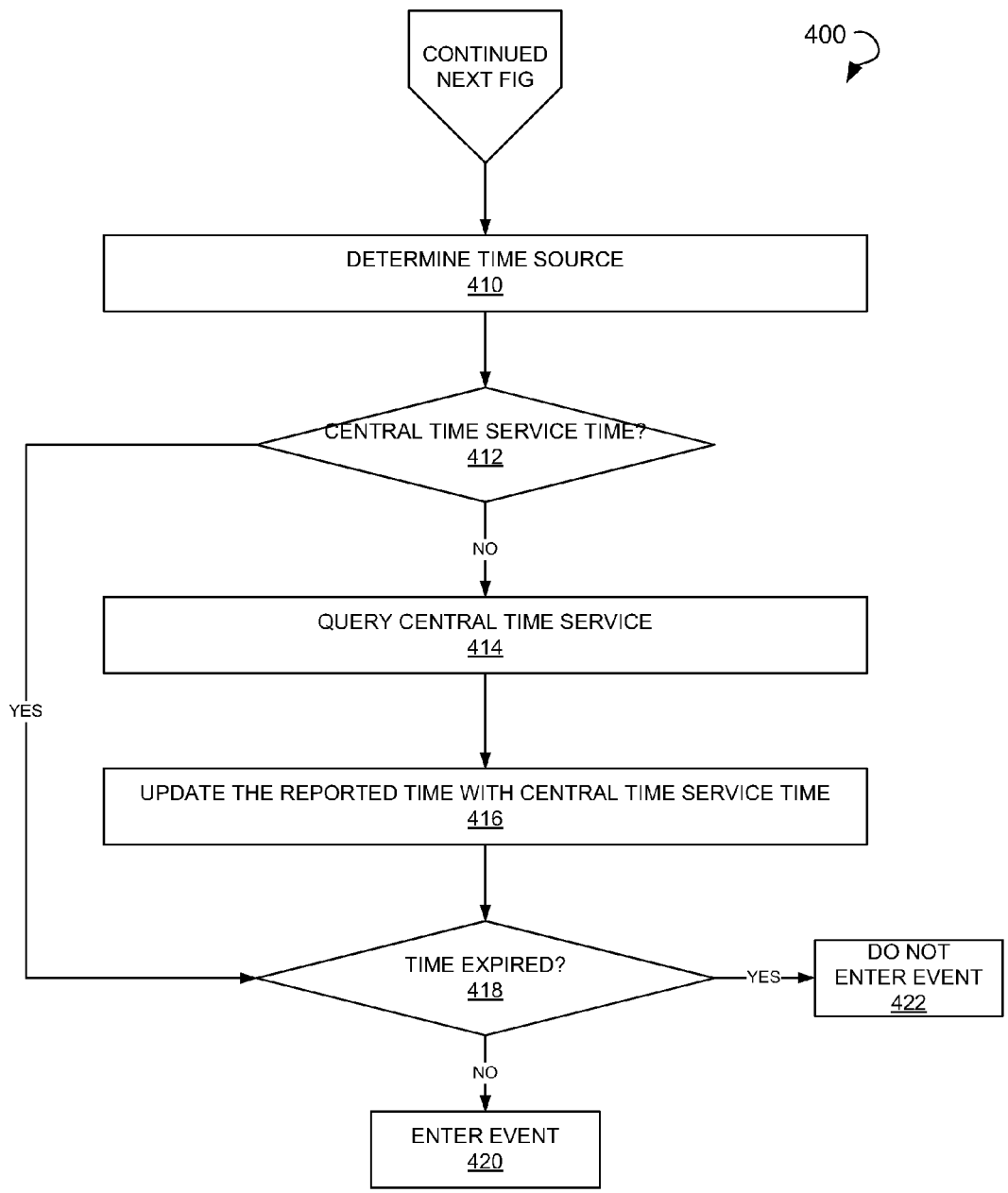
FIG. 5 is the second part of a detailed flow chart illustrating a method to enforce collaboration rules by providing central time service, in accordance with an example embodiment.

FIGS. 4 and 5 illustrate a detailed flow chart of a method 400 to enforce collaboration rules, in accordance with an example embodiment. The method 400 may be performed by processing logic that may comprise hardware (e.g., dedicated logic, programmable logic, microcode, etc.), software (such as run on a general-purpose machine system or a dedicated machine), or a combination of both. In one example embodiment, the processing logic resides at the collaboration workflow processor 200 illustrated in FIG. 2.

As shown in FIG. 4, at operation 402, the participation module 214 may distribute to participants invitations to participate in a collaboration workflow. For example, a shared review may be initiated by inviting a number of reviewers to contribute to the review of a document. The reviewers may then collaborate by using commenting and markup tools and add comments to the document. The initiator of the review workflow may specify a deadline by which the reviewers are to complete entering their comments. The method 400 to enforce collaboration rules may be utilized advantageously to enforce a rule that once the deadline has expired, no reviewer may add or publish comments to the document. In some embodiments, a collaboration process may be configured such that a reviewer may be permitted to submit comments late upon approval of the document owner or the collaboration workflow originator.

At operation 404, the collaboration tracking module 212 illustrated in FIG. 2 may establish rules of collaboration based on time (e.g., a deadline). At operation 406, the processing module 204 may receive a request to enter a collaboration event, and at operation 408, the communication module may receive the reported time of the collaboration event.

At operation 410, the processing module 204 may determine the source of the reported time. If, at decision block 412, it is determined that the reported time is provided by the central time service, the method 400 proceeds to decision block 418. At decision block 418, it may be determined, based on the reported time, whether the time to enter the collaboration event into the collaboration workflow has expired. If it is determined at decision block 418 that the time to enter the collaboration event has not expired, the collaboration event may be entered into the collaboration workflow.

If, on the other hand, it is determined at decision block 412 that the time of the collaboration event is the participant machine time, the method 400 may proceed to operation 414 and utilize the time query module 208 to query the central time service until the central time service provides the current time.

Once the central time service time is obtained by the time query module 208, the updating module 210 may update the reported time with the central time service time at decision block 416. Then, at decision block 418, it may be determined whether the time to enter the collaboration event has expired based on the updated reported time. If it is determined that that the time to enter the collaboration event has not expired, at operation 420, the collaboration tracking module 212 of FIG. 2 may enter the collaboration event into the collaboration workflow. If, on the other hand, it is determined at operation 418 that the time has expired, the event is not entered into the collaboration workflow in operation 422. In one embodiment, a collaboration event may be entered into the collaboration workflow by adding a collaboration record into a designated workflow events repository (e.g., a database table in the database 162 of FIG. 1). An example collaboration record may be described with reference to FIG. 6.

FIG. 6 is a block diagram illustrating a collaboration record 600, in accordance with an example embodiment. The example collaboration record 600 may be utilized by the collaboration workflow processor 200 of FIG. 2 to access data related to collaboration workflows, collaboration events, collaboration rules, and invitations sent to participants of collaboration workflows. For example, the collaboration workflow processor may need to access the data included in the collaboration record 600 which provides the origin of the reported time in order to determine whether to update the reported time with a central time service time.

The collaboration record may be stored in the database 142, 152, or 162 depending on the respective collaboration workflow. As shown in FIG. 6, the example collaboration record 600 may comprise fields 602 through 612.

A "COLLABORATION EVENT TYPE" field 602 may be utilized to store a value representing the type of the collaboration event (e.g., "review"). An "INVITATION MODE" field 604 may be utilized to store a value representing a way in which the invitations to participate in the collaboration workflow are distributed (e.g., email). An "EXPIRY TIME" field 606 may be utilized to store a value representing a time by which collaboration events may be entered. A "REPORTED TIME" field 608 may be utilized to store the time of the collaboration event as reported to the collaboration workflow. If the time is reported by the machine time service 112, the reported time may differ from the updated time based on the time provided by the central time service.

An "UPDATED TIME" field 610 may be utilized to store the updated time as updated by the updating module 210. The "UPDATED TIME" 610 is populated when it is determined that the "REPORTED TIME" field 608 is reported by the machine time service 112. A "CONNECTION FLAG" field 622 may be utilized to store information such as whether the reported is provided by a participant machine (e.g., the participant machine 110 illustrated in FIG. 1) or by an associated central time service (e.g., the WAN central time service 164 illustrated in FIG. 1).

While some embodiments of method and system to enforce collaboration rules include updating the reported time with the central time service time whenever the central time service becomes available, other embodiments may be implemented and utilized. For example, in an alternative embodiment, a collaboration event may be first time stamped utilizing local time reported by the participant's machine. The local time may then be compared to the time reported by the central time service. The time stamp may be updated with the time reported by the central time service only if the difference between the time reported by the participant machine and the time reported by the central time service differs by more than a predetermined threshold.

Figure 7:
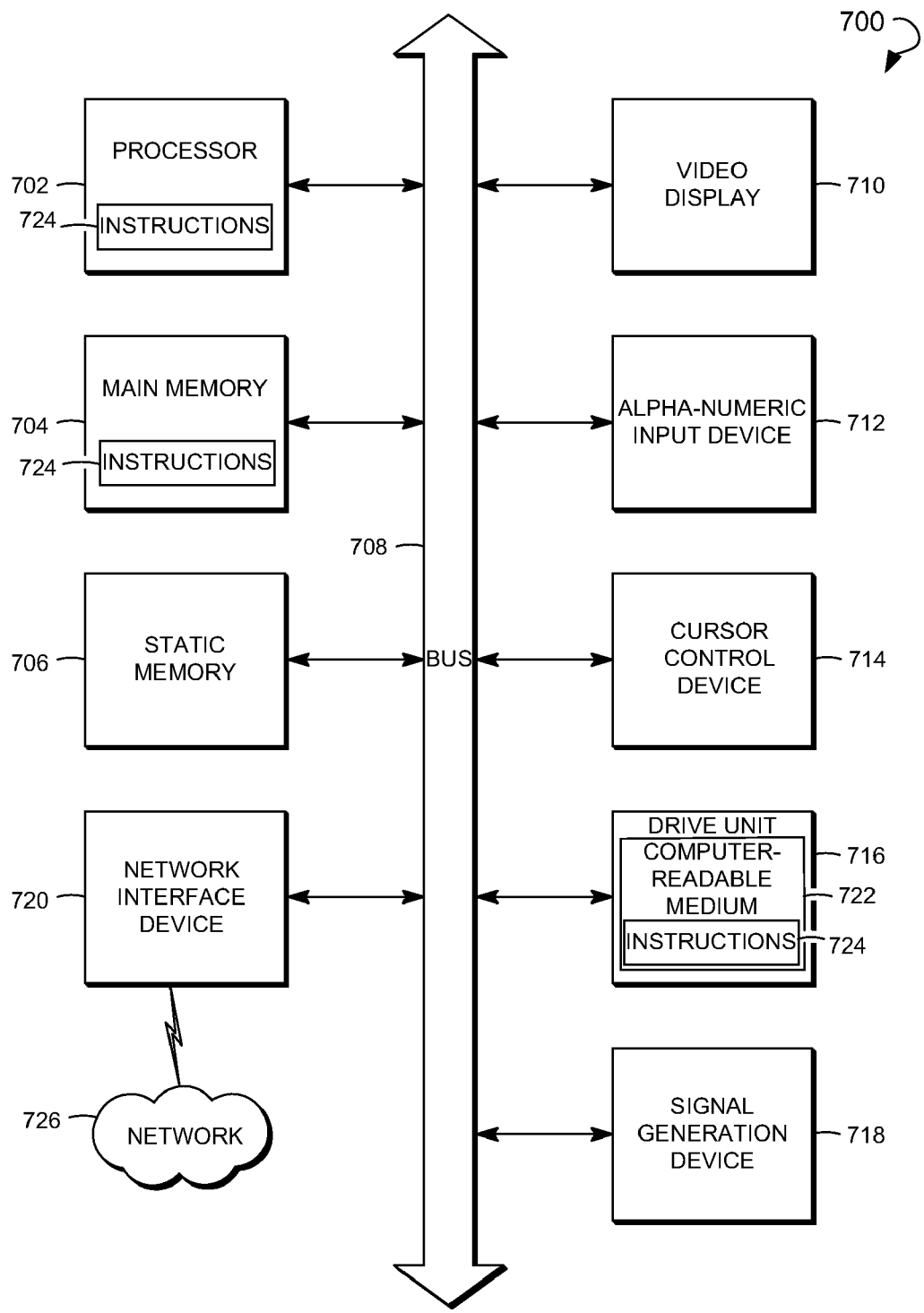
FIG. 7 illustrates a diagrammatic representation of a machine in the example form of a machine system within which a set of instructions for causing the machine to perform any one or more of the methodologies discussed herein may be executed.

FIG. 7 shows a diagrammatic representation of a machine in the example electronic form of a machine system 700 within which a set of instructions for causing the machine to perform any one or more of the methodologies discussed herein may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal machine (PC), a tablet PC, a set-top box (STB), a Personal Digital Assistant (PDA), a cellular telephone, a portable music player (e.g., a portable hard drive audio device such as an MP3 player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine system 700 includes a processor 702 (e.g., a central processing unit (CPU), a graphics processing unit (GPU) or both), a main memory 704 and a static memory 706, which communicate with each other via a bus 708. The machine system 700 may further include a video display unit 710 (e.g., a liquid crystal display (LCD) or a cathode ray tube (CRT)). The machine system 700 also includes an alphanumeric input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions and data structures (e.g., instructions 724) embodying or utilized by any one or more of the methodologies or functions described herein. The instructions 724 may also reside, completely or at least partially, within the main memory 704 and/or within the processor 702 during execution thereof by the machine system 700, the main memory 704 and the processor 702 also constituting machine-readable media.

The instructions 724 may further be transmitted or received over a network 726 via the network interface device 720 utilizing any one of a number of well-known transfer protocols (e.g., Hyper Text Transfer Protocol (HTTP)).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Such medium may also include, without limitation, hard disks, floppy disks, flash memory cards, digital video disks, random access memory (RAMs), read only memory (ROMs), and the like.

The embodiments described herein may be implemented in an operating environment comprising software installed on a machine, in hardware, or in a combination of software and hardware.

Although embodiments have been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
   receiving a request to report a collaboration event to a collaboration workflow;
   receiving a reported time of the collaboration event, the reported time being used to generate a timestamp applied to the collaboration event by a machine generating the collaboration event;
   determining, using a processor, an origin of the reported time;
   updating the timestamp of the collaboration event with a central time service time based on a determination that the origin of the reported time is not a central time service; and
   based on the updated timestamp, selectively reporting the collaboration event into the collaboration workflow.

2. The computer-implemented method of claim 1, wherein the updating of the timestamp with the central time service time includes:
   determining a time difference between the reported time and the central time service time by comparing the reported time to the central time service time;
   comparing the time difference to a predetermined threshold; and
   based on the comparison, selectively replacing the timestamp with the central time service time.

3. The computer-implemented method of claim 1, wherein the selectively reporting the collaboration event into the collaboration workflow includes:
   comparing an updated timestamp to a predetermined deadline, the updated timestamp being the timestamp generated using the reported time updated with the central time service time; and
   reporting the collaboration event into the collaboration workflow in response to determining that the updated timestamp indicates that the predetermined deadline has not been reached.

4. The computer-implemented method of claim 1, wherein the selectively reporting the collaboration event into the collaboration workflow includes:
   comparing the updated timestamp to a predetermined deadline, the updated timestamp being the timestamp generated using the reported time updated with the central time service time; and
   suppressing the reporting of the collaboration event into the collaboration workflow in response to determining that the updated timestamp indicates that the predetermined deadline has been reached.

5. The computer-implemented method of claim 1, wherein the collaboration workflow includes collaboration rules, the method further comprising enforcing the collaboration rules based on the timestamp of the collaboration event.

6. The computer-implemented method of claim 1, wherein the determining of the origin of the reported time is based on connection data indicative of whether the central time service was available when the collaboration event occurred.

7. The computer-implemented method of claim 1, wherein the updating of the timestamp occurs when the reported time is a machine time of a machine associated with the collaboration event.

8. The computer-implemented method of claim 1, further comprising: identifying a network as being associated with the collaboration workflow; identifying the central time service as being associated with the network; and updating the timestamp with the central time service time provided by the central time service subsequent to identifying the central time service as being associated with the network.

9. The computer-implemented method of claim 8, wherein the network associated with the collaboration workflow is at least one of the Internet, a Wide Area Network (WAN), or a Local Area Network (LAN).

10. The computer-implemented method of claim 1, wherein the origin is a central time service based on availability of a network connection to the central time service at the time of the generating of the collaboration event and the origin is the machine based on unavailability of the network connection to the central time service at the time of the generating of the collaboration event.

11. A computer-implemented system comprising:
    a processor of a machine;
    a communication module to receive a request to report a collaboration event to a collaboration workflow and to receive a reported time of the collaboration event, the reported time being used to generate a timestamp applied to the collaboration event by the machine generating the collaboration event;
    a processing module to determine, using the processor, an origin of the reported time and to update the timestamp with a central time service time based on a determination that the origin of the reported time is not a central time service; and
    an event reporting module to selectively report the collaboration event into the collaboration workflow based on the updated timestamp.

12. The computer-implemented system of claim 11, further comprising an updating module to perform one or more of the following:
    determine a time difference between the reported time and the central time service time by comparing the reported time to the central time service time;
    compare the time difference to a predetermined threshold; and
    based on the comparison, selectively replace the timestamp with the central time service time.

13. The computer-implemented system of claim 11, wherein the event reporting module is to selectively report the collaboration event into the collaboration workflow by performing one or more of the following:

compare an updated timestamp to a predetermined deadline, the updated timestamp being the timestamp updated with the central time service time; and report the collaboration event into the collaboration workflow in response to determining that the updated timestamp indicates that the predetermined deadline has not been reached.

14. The computer-implemented system of claim 11, wherein the event reporting module is to selectively report the collaboration event into the collaboration workflow by performing one or more of the following:

compare an updated timestamp to a predetermined deadline, the updated timestamp being the timestamp updated with the central time service time; and suppress the reporting of the collaboration event into the collaboration workflow in response to determining that the updated timestamp indicates that the predetermined deadline has been reached.

15. The computer-implemented system of claim 11, wherein the collaboration workflow includes collaboration rules, the system further comprising an enforcing module to enforce the collaboration rules based on an updated timestamp of the collaboration event, the updated timestamp being the timestamp updated with the central time service time.

16. The computer-implemented system of claim 11, wherein the processing module is to determine the origin of the reported time based on connection data indicative of whether the central time service was available when the collaboration event occurred.

17. The computer-implemented system of claim 11, wherein the processing module is to:

identify a network as being associated with the collaboration workflow;

identify the central time service as being associated with the network; and update the timestamp with the central time service time provided by the central time service subsequent to identifying the central time service as being associated with the network.

18. The computer-implemented system of claim 17, wherein the network is at least one of the Internet, a WAN or a LAN.

19. The computer-implemented system of claim 11, wherein the collaboration event is a signing of a document.

20. The computer-implemented system of claim 11, wherein the collaboration event is selected from a group of events consisting of entering a comment, deleting the comment, modifying the comment, and publishing the comment.

21. The computer-implemented system of claim 11, wherein the collaboration event is submitting form data.

22. The computer-implemented system of claim 11, wherein the collaboration workflow is a shared review.

23. The computer-implemented system of claim 11, wherein the collaboration workflow is a form distribution workflow.

24. A computer-implemented apparatus comprising:

a processor of a machine;

means for receiving a request to report a collaboration event to a collaboration workflow;

means for receiving a reported time of the collaboration event, the reported time being used to generate a timestamp applied to the collaboration event by a machine generating the collaboration event;

means for determining, using the processor, an origin of the reported time;

means for updating the timestamp with a central time service time based on a determination that the origin of the reported time is not a central time service to produce an updated timestamp; and based on the updated timestamp, means for selectively reporting the collaboration event into the collaboration workflow.

25. A non-transitory computer-readable medium comprising instructions, which when implemented by one or more processors, perform operations comprising:

receiving a request to report a collaboration event to a collaboration workflow;

receiving a reported time of the collaboration event, the reported time being used to generate a timestamp applied to the collaboration event by a machine generating the collaboration event;

determining an origin of the reported time;

updating the timestamp with a central time service time based on a determination that the origin of the reported time is not a central time service to produce an updated timestamp; and based on the updated timestamp, selectively reporting the collaboration event into the collaboration workflow.

\* \* \* \* \*